US010312558B2

(12) United States Patent
Yang

(10) Patent No.: US 10,312,558 B2
(45) Date of Patent: *Jun. 4, 2019

(54) BATTERY PACKAGING AND INSERT MOLDING FOR ELECTRIC VEHICLES

(71) Applicant: THUNDER POWER NEW ENERGY VEHICLE DEVELOPMENT COMPANY LIMITED, Central (HK)

(72) Inventor: Yung-Kang Yang, Taichung (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 180 days.

This patent is subject to a terminal disclaimer.

(21) Appl. No.: 15/191,217

(22) Filed: Jun. 23, 2016

(65) Prior Publication Data

US 2017/0194675 A1 Jul. 6, 2017

Related U.S. Application Data

(60) Provisional application No. 62/272,711, filed on Dec. 30, 2015.

(51) Int. Cl.
*H01M 10/613* (2014.01)
*H01M 10/643* (2014.01)
(Continued)

(52) U.S. Cl.
CPC ....... *H01M 10/613* (2015.04); *B60L 11/1874* (2013.01); *B60L 11/1877* (2013.01);
(Continued)

(58) Field of Classification Search
CPC ............ H01M 10/613; H01M 10/625; H01M 10/643; H01M 10/6557
See application file for complete search history.

(56) References Cited

U.S. PATENT DOCUMENTS

| 9,865,905 | B2 * | 1/2018 | Yang | H01M 10/6551 |
| 2010/0266883 | A1 * | 10/2010 | Koetting | H01M 2/1077 429/96 |
| 2013/0230760 | A1 * | 9/2013 | Pan | H01M 10/5016 429/120 |

FOREIGN PATENT DOCUMENTS

| DE | 10 2012 000996 A1 | 7/2013 |
| EP | 2 149 926 A1 | 2/2010 |

(Continued)

OTHER PUBLICATIONS

European Search Report for EP 16 20 7052 dated Mar. 28, 2017, 7 pages.

*Primary Examiner* — Stewart A Fraser
*Assistant Examiner* — Rachel L Zhang
(74) *Attorney, Agent, or Firm* — Kilpatrick Townsend & Stockton LLP

(57) ABSTRACT

A battery pack for an electric vehicle may include a plurality of battery cells arranged in on or more rows, a coolant loop, and a molded insert that encompasses the plurality of cells and the coolant loop such that the plurality of cells and the coolant loop are fixed relative to each other. The molded insert may cover a large portion of the coolant loop and/or the individual battery cells of the battery pack. An injection mold can be used as a fixture to hold the individual battery cells in place relative to the coolant loop, and the molded insert can be injected around the battery and coolant loop assembly.

20 Claims, 10 Drawing Sheets

(51) Int. Cl.
  *B60L 11/18*     (2006.01)
  *H01M 10/0525*   (2010.01)
  *H01M 2/10*      (2006.01)
  *H01M 10/625*    (2014.01)
  *H01M 10/6557*   (2014.01)
  *H01M 2/02*      (2006.01)

(52) U.S. Cl.
  CPC ............ *H01M 2/02* (2013.01); *H01M 2/0295* (2013.01); *H01M 2/1077* (2013.01); *H01M 10/0525* (2013.01); *H01M 10/625* (2015.04); *H01M 10/643* (2015.04); *H01M 10/6557* (2015.04); *H01M 2220/20* (2013.01)

(56) References Cited

FOREIGN PATENT DOCUMENTS

| | | |
|---|---|---|
| GB | 2 418 058 A | 3/2006 |
| WO | 2015/049215 A1 | 4/2015 |

\* cited by examiner

BATTERY PACKAGING AND INSERT MOLDING FOR ELECTRIC VEHICLES

CROSS-REFERENCES TO RELATED APPLICATIONS

This patent application is a nonprovisional of and claims priority to U.S. Pat. App. No. 62/272,711, filed Dec. 30, 2015, entitled BATTERY PACKAGING AND INSERT MOLDING FOR ELECTRIC VEHICLES, which is related to the following commonly assigned patent applications. Each of these applications is incorporated herein by reference:

U.S. Pat. App. No. 62/272,712, filed Dec. 30, 2015, entitled BATTERY PACKAGING AND INSERT MOLDING FOR ELECTRIC VEHICLES.

U.S. Pat. App. No. 62/272,713, filed Dec. 30, 2015, entitled INTEGRATED BUSBAR AND BATTERY CONNECTION FOR ELECTRIC VEHICLE BATTERY PACKS.

BACKGROUND

An electric vehicle uses one or more electric motors powered by electrical energy stored in a rechargeable battery pack. Lithium-based batteries are often chosen for their high power and energy density. In order to ensure that an electric vehicle operates efficiently and safely, the temperature of the battery pack must be maintained within a defined range of optimal temperatures. The coolant system of electric vehicle can be physically extended to the battery pack to remove excess heat, thereby increasing the service life of the battery pack and increasing the distance that can be traveled on a single charge.

As the popularity of electric vehicles increases, efficiency in the manufacturing process will become more important. Processes and devices that decrease the cost of manufacturing battery packs while simultaneously increasing their reliability and safety will be key to meeting customer demands. Specifically, there is a need for processes and devices that ensure reliable electrical connections between individual battery cells, that efficiently cool the battery pack, and that aid in the manufacturing process of assembling the thousands of individual battery cells into modular packs that can be installed and replaced when necessary.

BRIEF SUMMARY

In some embodiments, a battery pack for an electric vehicle may include a plurality of battery cells arranged in on or more rows, a coolant loop, and a molded insert that encompasses the plurality of cells and the coolant loop such that the plurality of cells and the coolant loop are fixed relative to each other.

In some embodiments, a method of manufacturing a battery pack for an electric vehicle may include providing an injection mold, and placing a plurality of battery cells in the injection mold arranged in one or more rows. The method may also include routing a coolant loop around the one or more rows of the plurality of battery cells in the injection mold, and injection molding a molded insert that encompasses the plurality of cells and the coolant loop such that the plurality of cells and the coolant loop are fixed relative to each other.

In each of these embodiments, one or more of the following features may also be present in any combination and without limitation. The molded insert may be injection molded around the plurality of battery cells and the coolant loop using an injection mold. The injection mold may include holes for the coolant loop to exit the injection mold. The molded insert may require less than 10 minutes to solidify after the molded insert is injection molded. The molded insert may include one or more plastics or epoxies. The molded insert may fill a gap between the coolant loop and the plurality of battery cells. The molded insert may leave tops and bottoms of the plurality of battery cells exposed. The molded insert may fill gaps between the plurality of battery cells. A top of the molded insert may be level with a top of the plurality of battery cells. A top of the molded insert may stop at least 5 mm below a top of the plurality of battery cells.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments of devices and processes for applying a molded insert to a battery pack. A plurality of battery cells can be arranged into a modular pack with integrated coolant loops. In order to fix the individual battery cells in place, a molded insert can be applied via injection molded using materials that are specially made and designed to minimize the time it takes for the molded insert to solidify. For example, each modular battery pack in the rechargeable battery system may include between 500 and 1,000 individual battery cells. These individual battery cells can be placed into a fixture of an injection system and a compound of one or more plastics can be injected into the battery pack. The temperature and pressure of this injection are lower than that of epoxy or ultraviolet glue, and it solidifies relatively quickly in as little as 3 minutes. The resulting solid modular battery pack significantly reduces the cost and time required to manufacture battery systems for electric vehicles.

Figure 1:
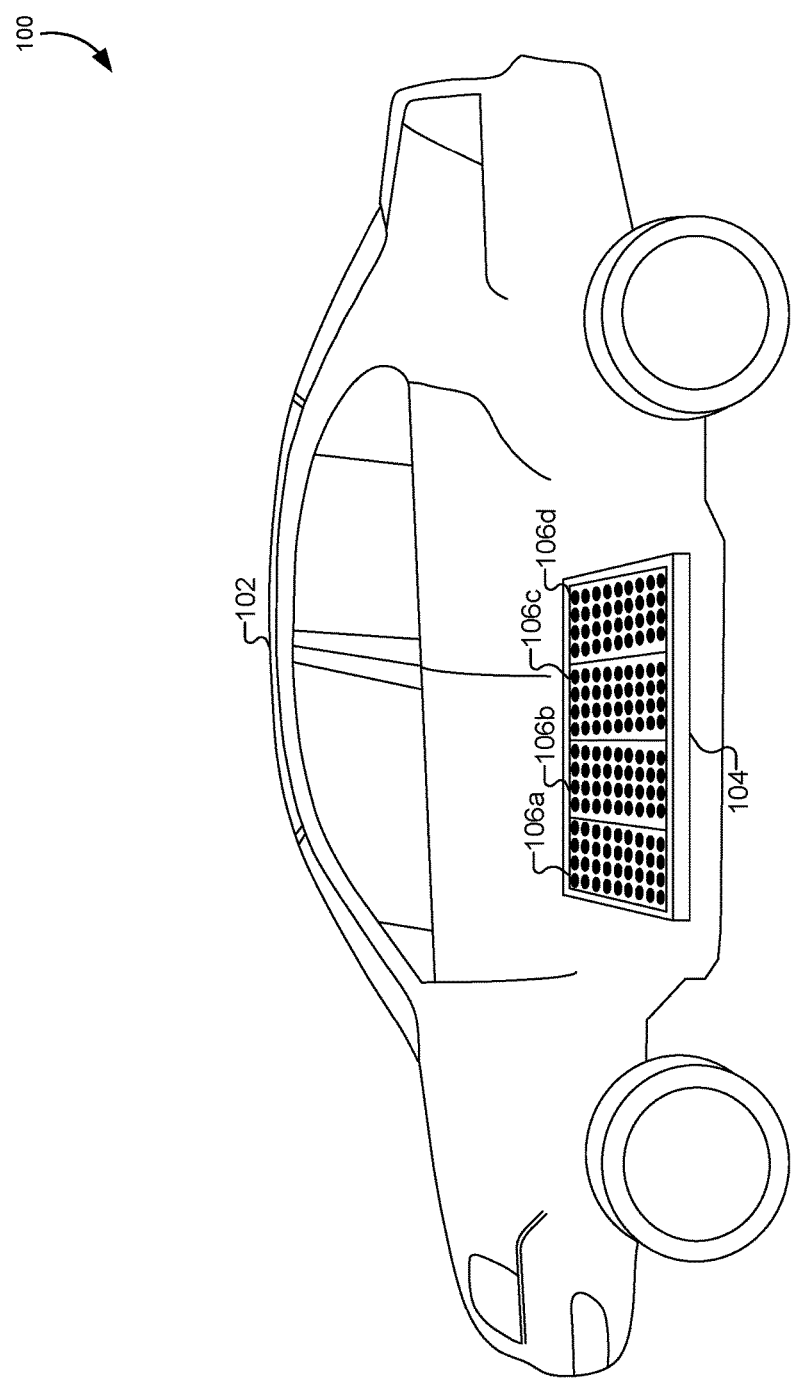
FIG. 1 illustrates a simplified diagram of an electric vehicle with a rechargeable battery system, according to some embodiments.

FIG. 1 illustrates a simplified diagram 100 of an electric vehicle 102 with a rechargeable battery system 104, according to some embodiments. The rechargeable battery system 104 may be comprised of one or more battery packs 106. A battery pack may be comprised of a plurality of individual battery cells that are electrically connected to provide a particular voltage/current to the electric vehicle 102. Depending on the embodiment, the electric vehicle 102 may include hybrid vehicles that operate using both fuel combustion and stored electric power, as well as fully electric vehicles that operate entirely from stored electric power.

The rechargeable battery system 104 represents a major component of the electric vehicle 102 in terms of size, weight, and cost. A great deal of effort goes into the design and shape of the rechargeable battery system 104 in order to minimize the amount of space used in the electric vehicle 102 while ensuring the safety of its passengers. In some electric vehicles, the rechargeable battery system 104 is located under the floor of the passenger compartment as depicted in FIG. 1. In other electric vehicles, the rechargeable battery system 104 can be located in the trunk or in the hood areas of the electric vehicle.

While a smaller number of larger battery cells could be more energy-efficient, the size and cost of of these larger batteries are prohibitive. Furthermore, larger batteries require more contiguous blocks of space in the electric vehicle 102. This prevents larger batteries from being stored in locations such as the floor of the passenger compartment as depicted in FIG. 1. Therefore, some embodiments use a large number of smaller battery cells that are coupled together to generate electrical characteristics that are equivalent to single larger cells. The smaller cells may be, for example, the size of traditional AA/AAA batteries, and may be grouped together to form a plurality of battery packs 106. Each battery pack may include a large number of individual battery cells. In one embodiment, 700 individual lithium-ion batteries are joined together to form a single battery pack 106a, and the rechargeable battery system 104 may include four battery packs 106, eight battery packs, ten battery packs, sixteen battery packs, and/or the like, connected in parallel or series until the electrical requirements of the electric vehicle 102 are satisfied. The individual battery cells included in each battery pack 106 may total in the thousands for a single electric vehicle 102.

Figure 2:
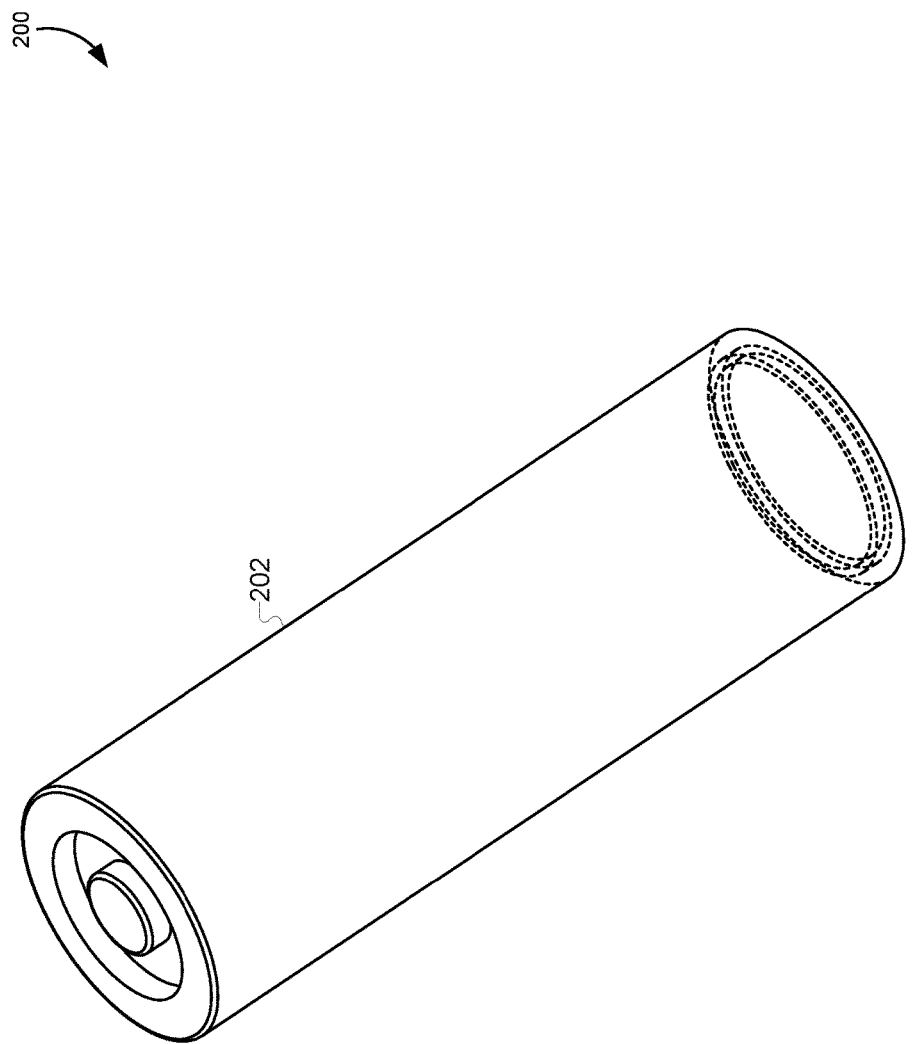
FIG. 2 illustrates a lithium-based battery that may be used in electric vehicles, according to some embodiments.

FIG. 2 illustrates a diagram 200 of a lithium-based battery 202 that may be used in electric vehicles, according to some embodiments. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and aproximately 45 g.

Figure 3:
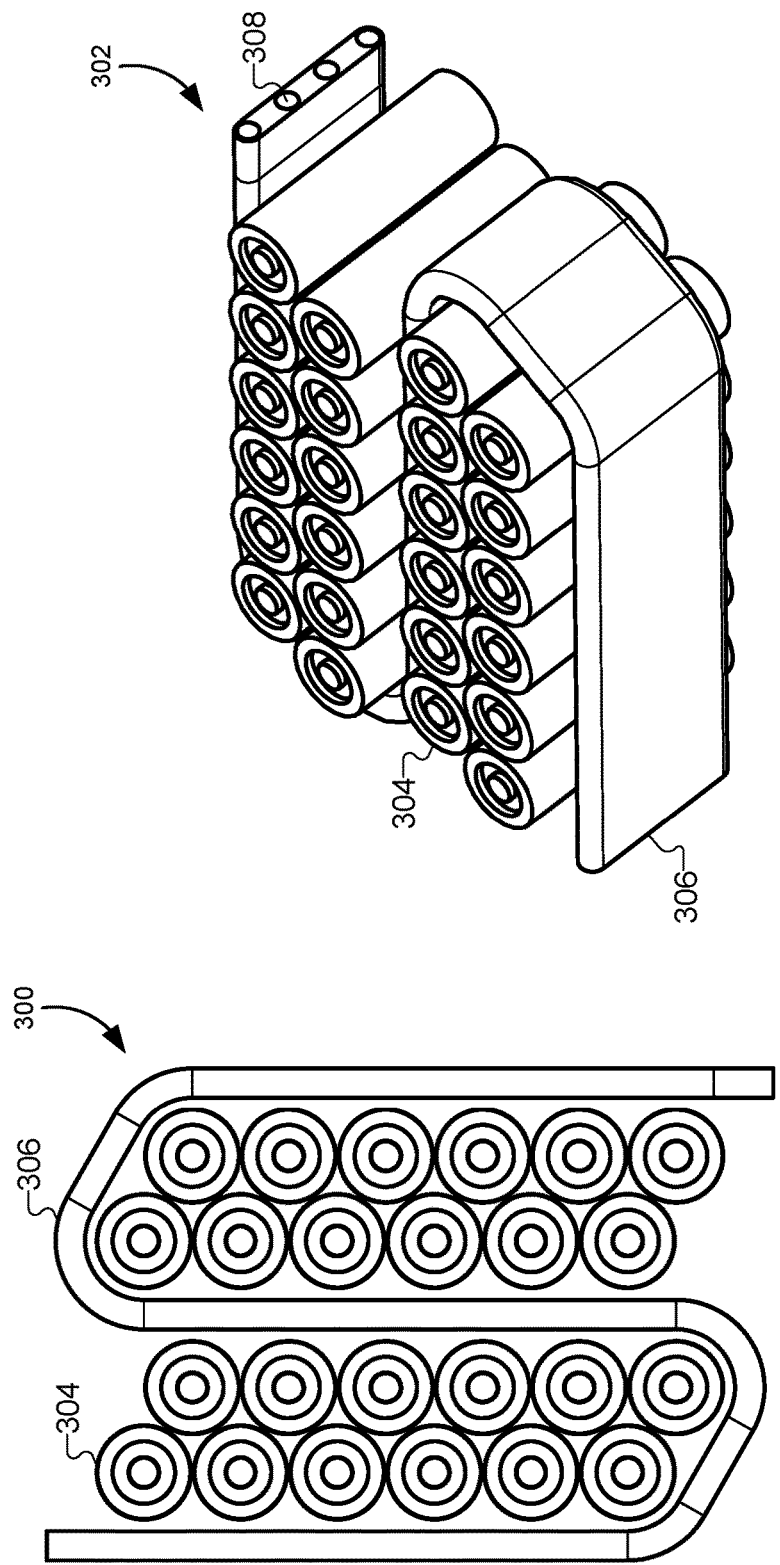
FIG. 3 illustrates a battery pack with a coolant loop, according to some embodiments.

FIG. 3 illustrates a top view 300 and an isometric view 302 of a battery pack 304 with a coolant loop 306, according to some embodiments. The battery pack 304 depicted in FIG. 3 is greatly simplified from an actual battery pack that would be used in electric vehicle. The number of individual battery cells and cell rows has been greatly reduced in order to describe the elements of the present invention simply and clearly. It will be understood that actual battery packs would include many more individual battery cells and more complicated routing of the coolant loop 306.

The individual battery cells in the battery pack 304 are linearly arranged in a series of rows, with each individual battery cell being adjacent to another battery cell within the row. In some embodiments, there will be no appreciable gap between the individual battery cells within a single row. In order to maximize the number of individual battery cells per unit volume, adjacent rows of battery cells are offset by approximately the radius of one individual battery cell. Adjacent rows are then placed next to each other in the offset position depicted in FIG. 3 such that each individual battery cell in a first row is adjacent to or contacting two individual battery cells in a second row. In some embodiments (not shown) three or more rows are placed adjacent to each other with no appreciable gaps therebetween.

The battery pack 304 of FIG. 3 includes pairs adjacent rows separated by a coolant loop 306. The electric vehicle may be configured to pump liquid coolant through the coolant loop 306 in order to transfer heat from the battery pack 304 to a radiator or other heat exchange system. The coolant loop 306 may include one or more coolant tubes 308 through which liquid coolant may be circulated. In some embodiments, the electric vehicle may use a dedicated coolant loop for the battery pack 304, while other embodiments may utilize an existing engine coolant system. In some embodiments, the coolant loop 306 may also be coupled to a heating system, such that the battery pack 304 can be heated when extreme weather causes the ambient temperature to drop below a preferred operating temperature range of the individual battery cells.

The coolant loop 306 may be routed around rows of individual battery cells in the battery pack 304. Each battery pack may include an inlet and an outlet for the coolant loop 306. In some embodiments, the coolant loop may be wrapped around pairs of rows of individual battery cells, such that each battery cell is adjacent to at least a portion of the coolant loop. Although not shown in FIG. 3, some coolant loops may have a wavy profile or a scalloped profile that conforms with the contours of the round individual battery cells in each row. An example of this type of coolant loop is depicted in U.S. Pat. No. 8,541,127, and is compatible with the molded insert described below. In other embodiments, such as the embodiment of FIG. 3, the coolant loop 306 can be maintained in a substantially straight fashion.

Figure 4:
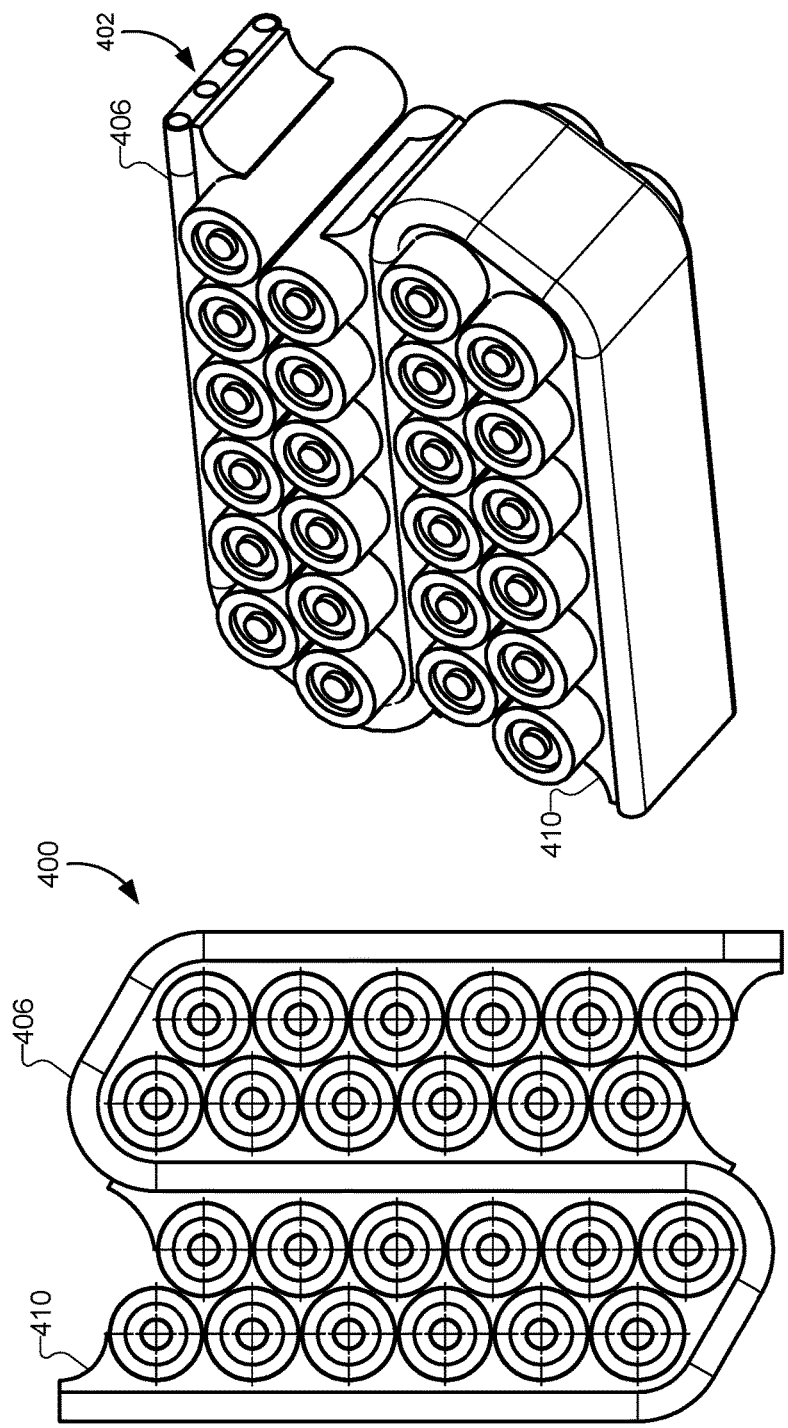
FIG. 4 illustrates a coolant loop with a thermal-coupling sleeve, according to some embodiments.

FIG. 4 illustrates a top view 400 and an isometric view 402 of a coolant loop 406 with a thermal pad 410, according to some embodiments. Instead of needing to crimp the coolant loop 406 into a wavy or scalloped pattern in order to conform to the curvature of the individual battery cells in the battery pack, a thermal pad 410 may be inserted between the coolant loop 406 and the individual battery cells. The thermal pad can be constructed from any thermally conductive material and can be pre-formed with scalloped edges on one side that conform to the curvature of the individual battery cells, and with a straight edge on the other side to bond with the coolant loop 406. For purposes of the present invention, it should be noted that the molded insert described below is compatible with any configuration of coolant loop 406 with or without a thermal pad 410.

Figure 5:
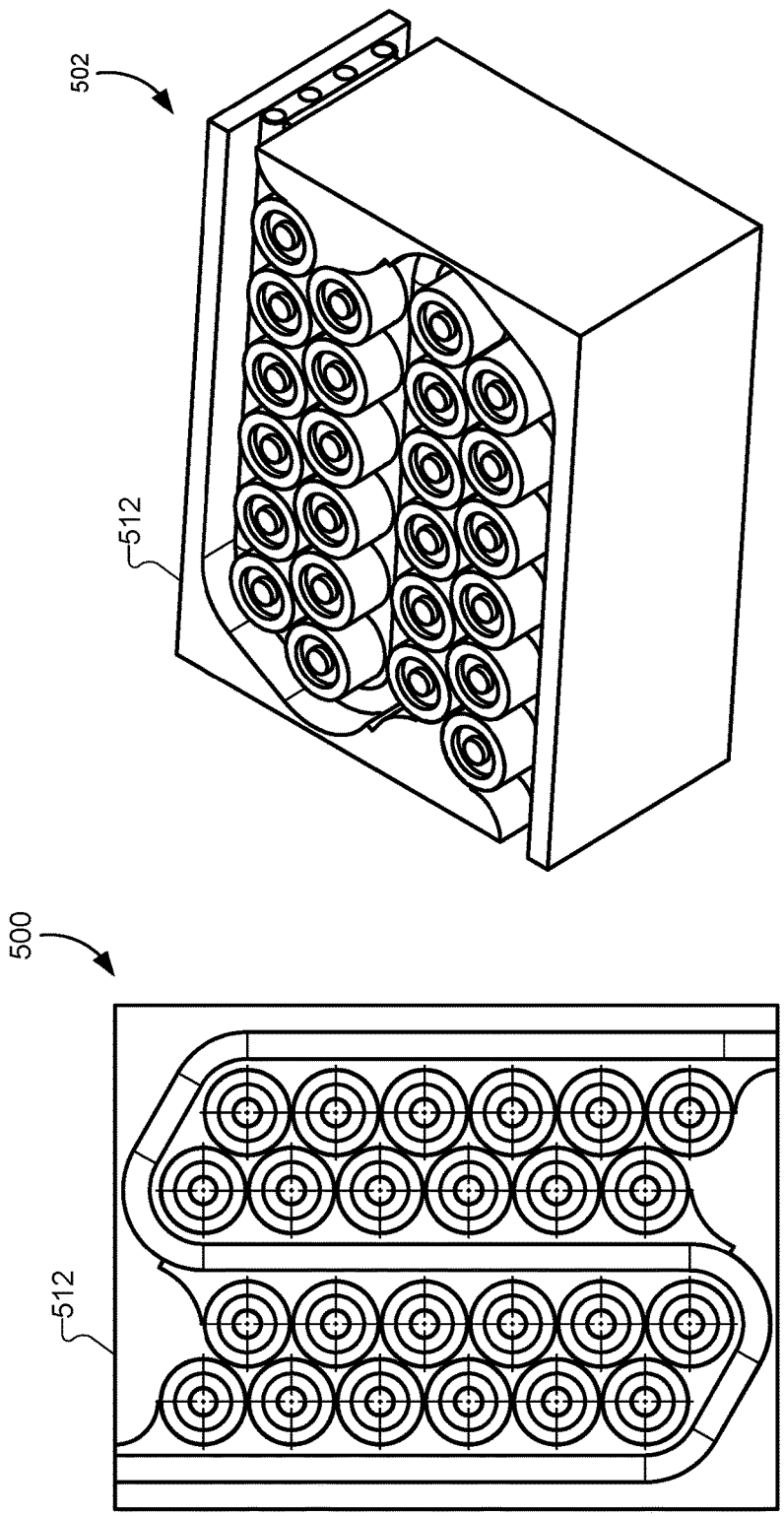
FIG. 5 illustrates a battery pack with a partial molded insert, according to some embodiments.

FIG. 5 illustrates a top view 500 and an isometric view 502 of a battery pack with a partial molded insert 512, according to some embodiments. Applying a solid molding around the coolant loop and the individual battery cells in a battery pack serves to transform these individual components into a solid battery pack that can withstand the rigors of sustained vehicle use. The solid molding ensures that the individual battery cells remain in place and the electrical connections are not disturbed by vibration and movement. The solid molding also forms a modular unit that can be moved, installed, and/or replaced easily during the manufacturing process of the rechargeable battery system and the service life of the electric vehicle. In one exemplary embodiment, 750 individual battery cells can be combined with one or more current loops to form a battery pack that is encased in a solid molding.

Prior to this disclosure, solid moldings were difficult to use because they required up to 12 hours of time to solidify. Such a delay during a mass manufacturing process was unacceptable, considering the sheer number of individual battery cells required for a single electric vehicle. However, the embodiments described herein may use a combination of materials that can solidify in as little as three minutes after being applied to the battery pack. In some embodiments, the material may be combination of plastics, epoxies, glues, and/or the like with a fast cure time.

The partial molded insert 512 depicted in FIG. 5 is referred to as "partial" because it is only applied around the exterior of the battery pack. In some embodiments, this can be sufficient to form a solid battery pack that can be reliably installed and used in an electric vehicle.

Figure 6:
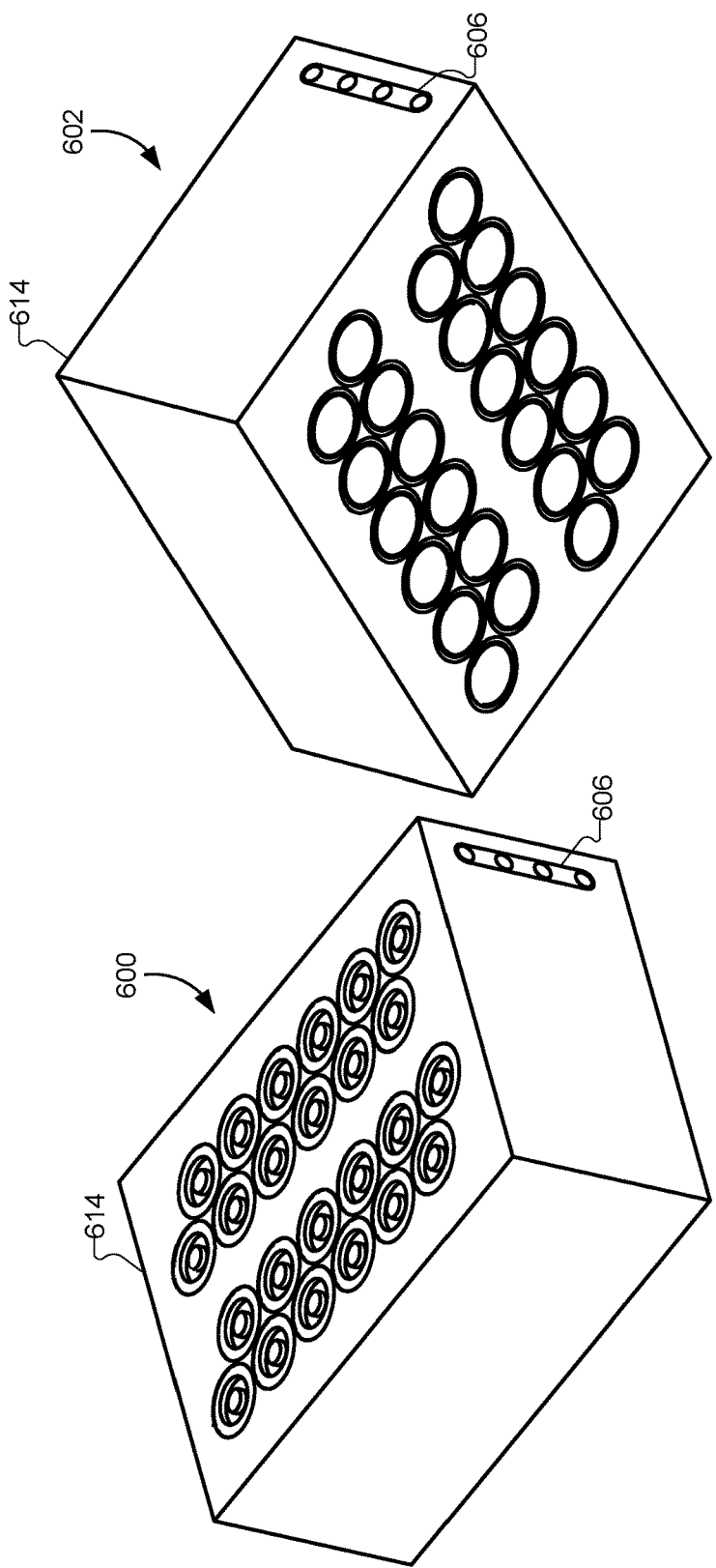
FIG. 6 illustrates a battery pack with a full molded insert according to some embodiments.

FIG. 6 illustrates a top isometric view 600 and a bottom isometric view 602 of a battery pack with a full molded insert 614 according to some embodiments. In this more typical embodiment, the molding material described above can be injected into an injection mold and allowed to flow around and through any cavities between the individual battery cells and any components related to the coolant loop 606. In some embodiments, the injection mold may include cavities in the mold that allow the coolant loop 606 to exit the molded insert 614, along with any electronics or electrical connections that connect the battery pack with the rest of the rechargeable battery system (not shown).

In this embodiment, the full molded insert 614 is applied such that it is level with the top of the individual battery cells. However, the full molded insert 614 does not cover the tops of individual battery cells or the bottoms of the individual battery cells. Instead, these areas of the individual battery cells are left exposed such that electrical connections can be made between individual battery cells after the molded insert is applied. For example, in order to provide more current from a battery pack, the tops (or "+") terminals of each of the individual battery cells may be connected together using a first metallic bus bar. Similarly, the bottoms (or "−") terminals of each of the individual battery cells may be connected together using a second metallic bus bar. Electrical connection from the first and second metallic bus bars can be provided from the battery pack to provide electrical power available with a large amount of electrical current from the battery pack. As will be understood by one having skill in the art, the individual battery cells may also be wired in series or in combinations of series and parallel to create greater voltages from the battery pack. By leaving the top and bottom terminals of the individual battery cells exposed by the full molded insert 614, either of these types of connections can be facilitated.

Figure 7A:
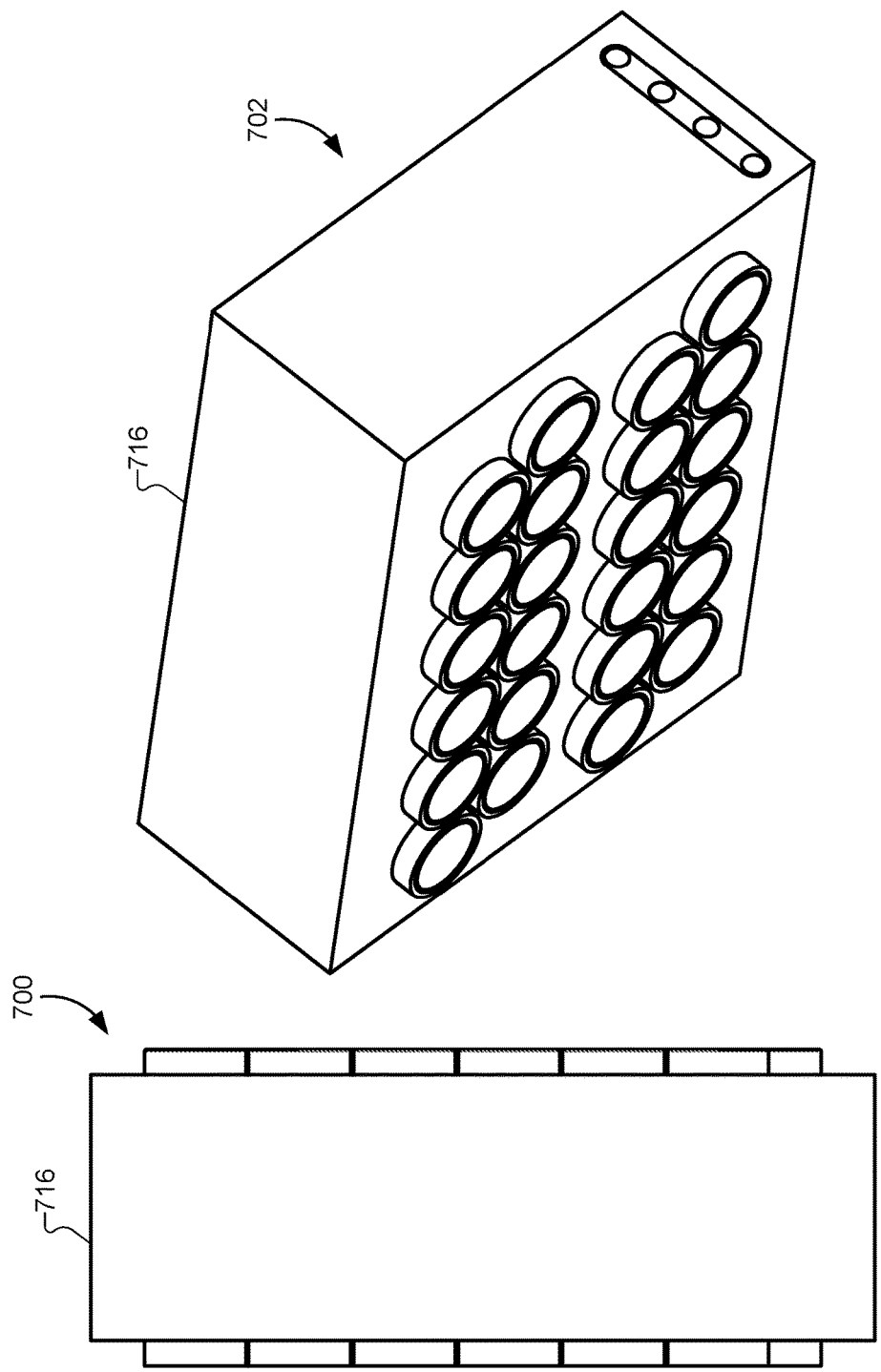
FIG. 7A illustrates a battery pack with a molded insert, according to some embodiments.

FIG. 7A illustrates a side view 708 and a bottom isometric view 702 of a battery pack with a molded insert 716, according to some embodiments. These embodiments are similar to the embodiments of FIG. 6, the difference being that the molded insert 716 does not extend all the way to the top and/or bottom terminals of the battery pack. Unlike the embodiments of FIG. 5, the molding material is allowed to flow into cavities between the individual battery cells and/or components related to the coolant loop. However, the injection mold is cast with cavities for the individual battery cells such that a portion of the top terminal and a portion of the bottom terminal are left exposed. In some embodiments, the exposed portion of the individual battery cells may be between 1 mm and 15 mm. The amount of each individual battery cell exposed may differ between the top and bottom portions of the individual battery cells. By leaving a portion of the individual battery cells exposed, some types of electrical connections to the individual battery cells may be more easily applied.

Figure 7B:
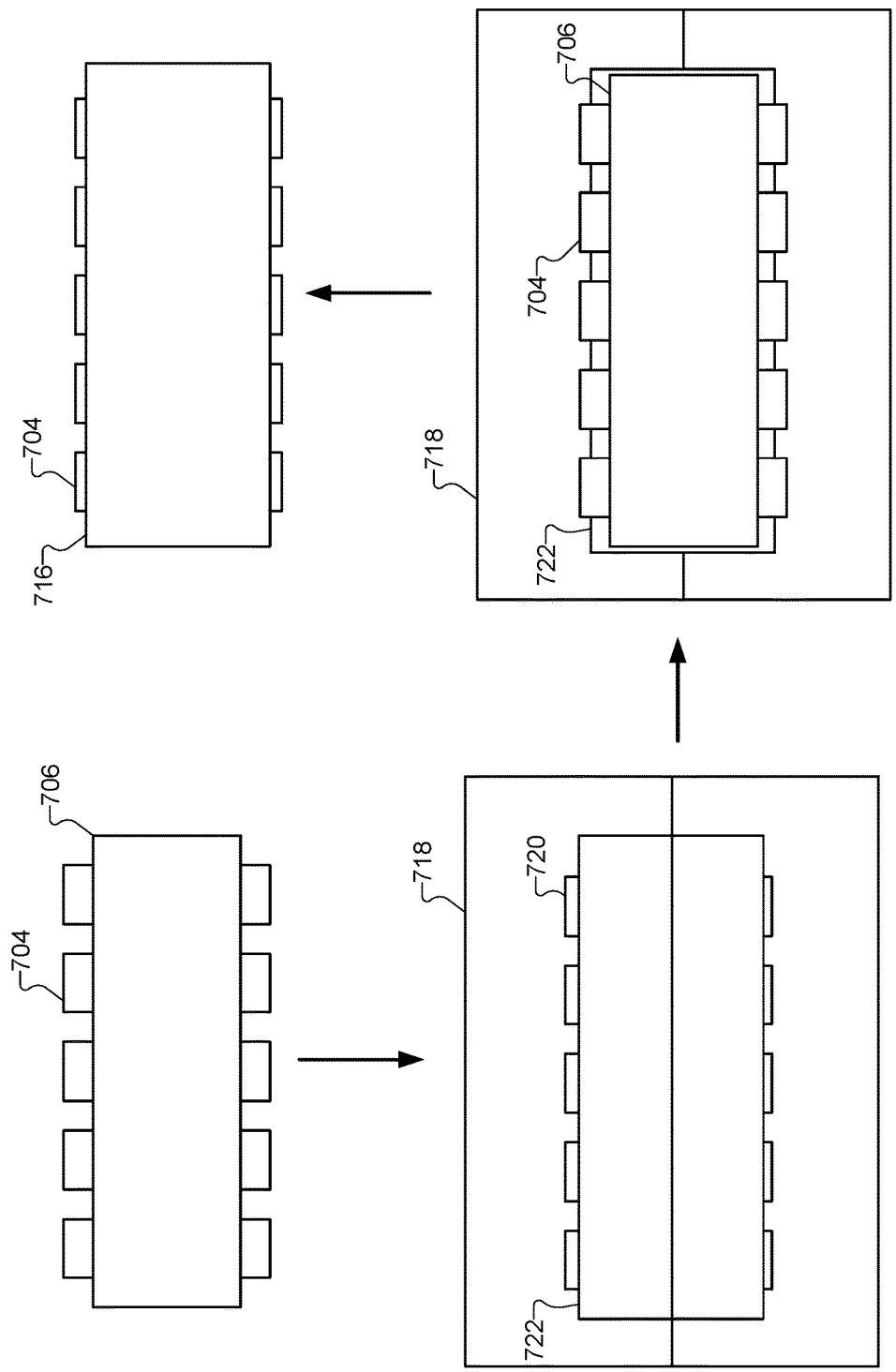
FIG. 7B illustrates a battery pack and coolant loop being fitted into an injection mold to apply a molded insert, according to some embodiments.

FIG. 7B illustrates battery cells 704 and a coolant loop 706 being fitted into an injection mold 718 to apply a molded insert 716, according to some embodiments. As described above, the individual battery cells 704 can be combined with a coolant loop 706. In order to route the coolant loop 706 through the individual battery cells 704, this individual battery cells may be placed into a fixture that holds the individual battery cell 704 in the proper position. The coolant loop 706 can be routed through the individual battery cells 704. An injection mold 718 may include cavities 722 that is large enough to accommodate the individual battery cells 704 and the coolant loop 706, leaving room for the molded insert 716 to cover both. In some embodiments, the injection mold 718 may be divided into a top half and bottom half. In some embodiments, the fixture used to place the individual battery cells 704 may be an integrated part of the injection mold 718. Alternatively, the fixture used to place the individual battery cell 704 may be separate from the injection mold 718, and may be placed within the injection mold 718 in order to hold individual battery cell 704 and/or the coolant loop 706 in place during the injection molding process.

In embodiments where the molded insert 716 does not extend all the way to the top of the individual battery cells 704, cavities 720 may be placed in the injection mold 718 to prevent the molded insert from extending to the top of the individual battery cells 704. In these embodiments, the injection mold 718 may be used as an assembly fixture as described above. The resulting molded insert 716 will cover the coolant loop 706 and a large portion of the individual battery cells 704, leaving the top and bottom of the individual battery cells 704 exposed.

Figure 8:
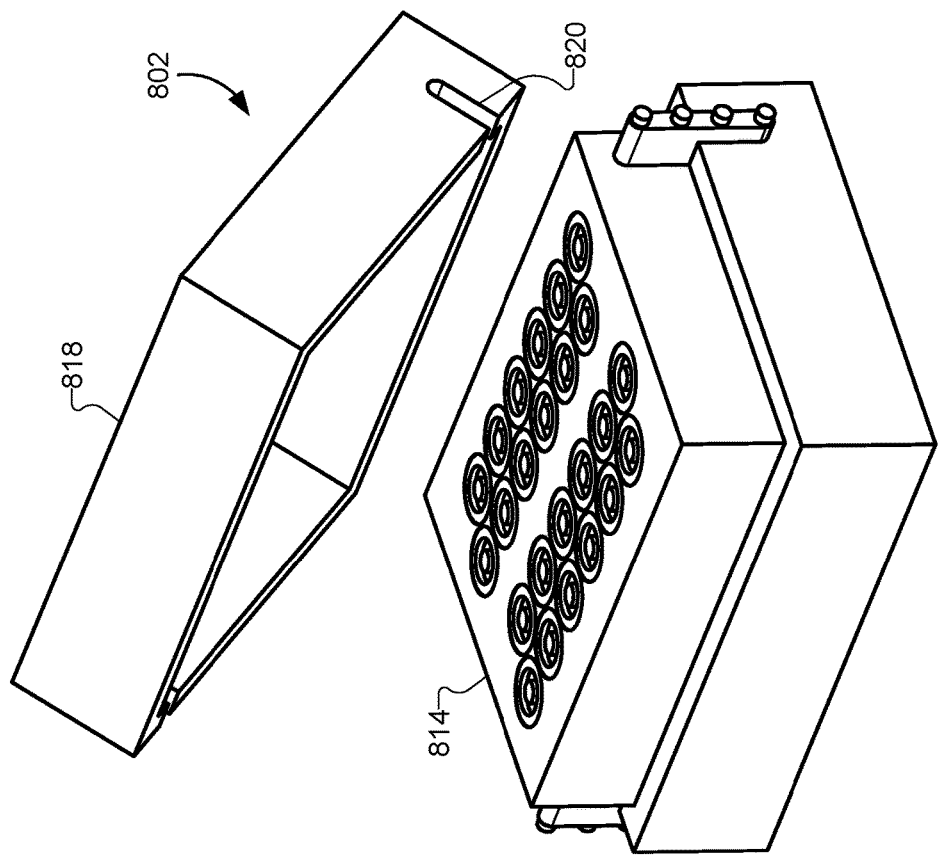
FIG. 8 illustrates a injection molding system for applying the molded insert to a battery pack, according to some embodiments.
Figure 8:
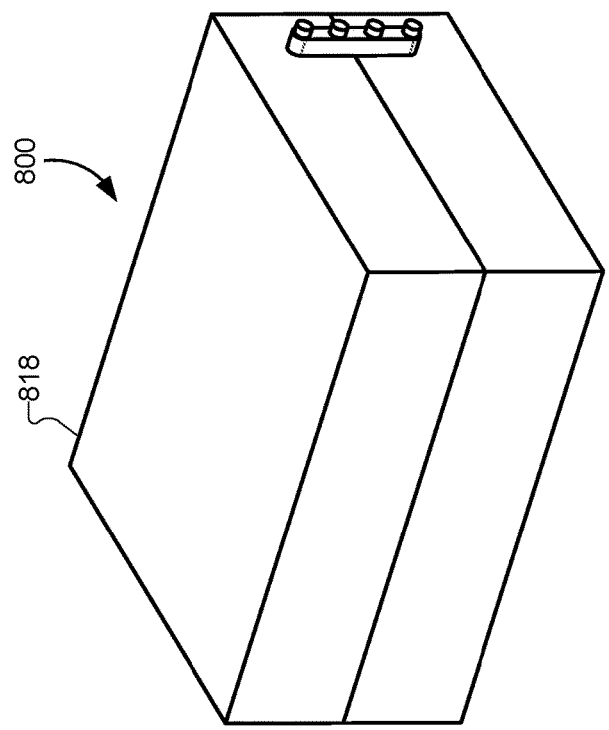

FIG. 8 illustrates a closed view 800 and an open view 802 of an injection mold 818 for applying the molded insert 814 to a battery pack, according to some embodiments. The injection mold may be comprised of two parts, into which the battery pack may be placed. In this embodiment, the injection mold is divided into a top and a bottom half. The individual battery cells and the components related to the coolant loop may be inserted into the injection mold 818, and the material for the mold may then be injected and allowed to cure for a few minutes before the two parts of the injection mold are separated and the battery pack removed.

In some embodiments, the injection mold 818 may be comprised of one or more openings 820 that allow components related to the coolant loop to exit the injection mold 818. Although not shown explicitly, other openings may also be provided to allow other connections, electrical or otherwise, to exit the injection mold 818. The result is a battery pack enclosed in the molded insert 814 with a coolant loop exiting and entering the molded insert 814 such that it can be connected to the cooling system for the rechargeable battery system.

Figure 9:
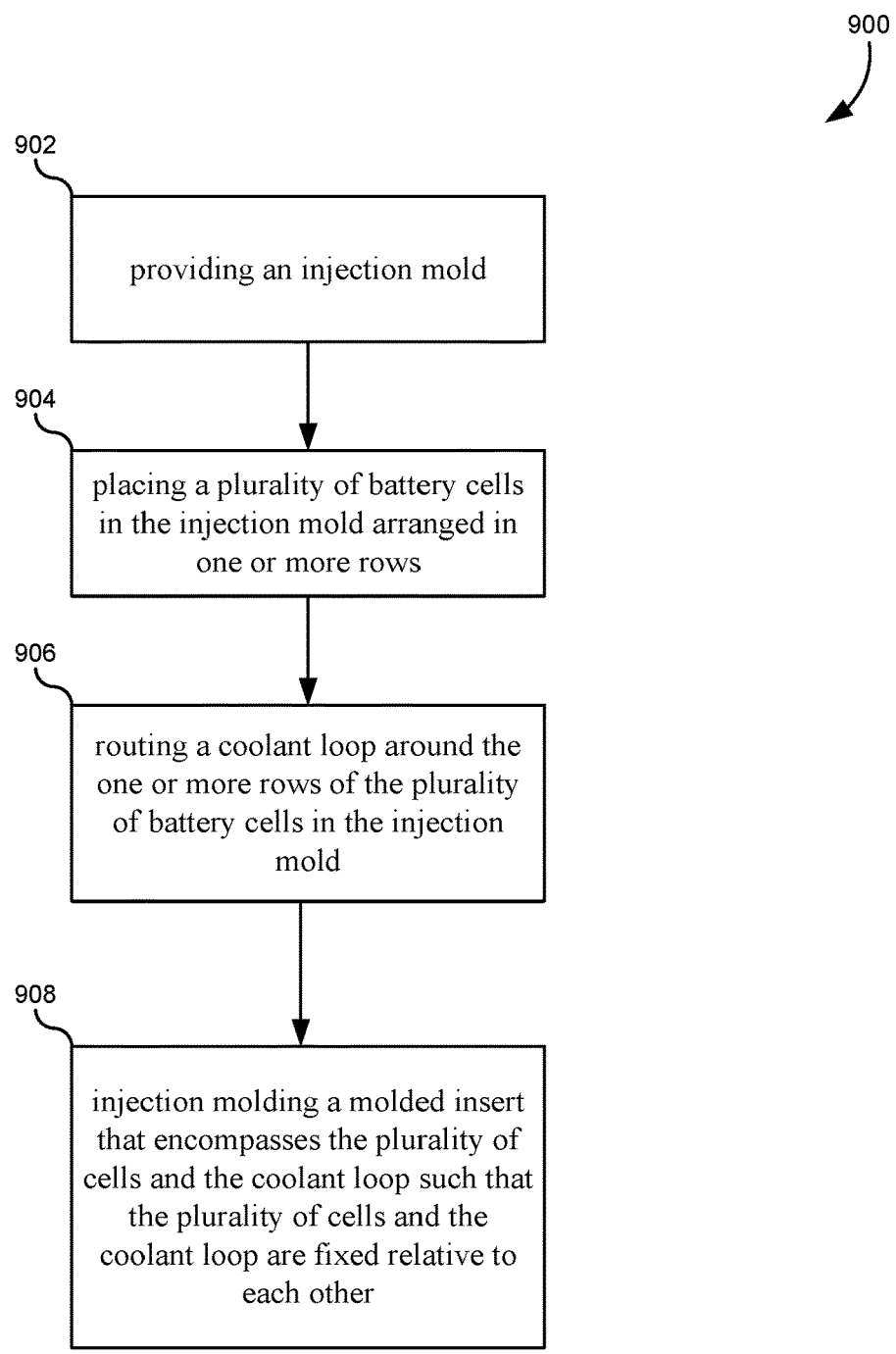
FIG. 9 illustrates a flowchart of a method for applying the molded insert to a battery pack, according to some embodiments.

FIG. 9 illustrates a flowchart 900 of a method for applying the molded insert to a battery pack, according to some embodiments. The method may include providing an injection mold (902). The injection mold may include recesses into which the individual battery cells are placed. The injection mold may also include cavities or markers for routing the coolant loop. Thus, a user can simply insert the battery cells into the recesses in the injection mold and route the coolant loop around the rows of the individual battery cells as shown in the figures above to guarantee that every battery pack manufactured with the injection mold is nearly identical. The method may also include placing a plurality of battery cells in the injection mold arranged in one or more rows (904), and routing a coolant loop around the one or more rows of the plurality of battery cells in the injection mold (906). In some embodiments, the injection mold may include holes for the coolant loop to exit the injection mold, such that the coolant loop can be routed out of the injection mold for connection to a cooling system.

The method may further include injection molding a molded insert that encompasses the plurality of cells and the coolant loop such that the plurality of cells and the coolant loop are fixed relative to each other (908). In some embodiments, the molded insert made be comprised of a plastic, or a combination of plastics and may require less than ten minutes to solidify after the molded insert is injected. In some embodiments, the molded insert may require between three and five minutes to solidify. The molded insert can be injected around only a periphery of the battery pack such that the interior of the battery pack is not filled with the molded insert. In other embodiments, the molded insert can be injected such that the molded insert fills gaps between each of the individual battery cells. The molded insert can also be injected such that the molded insert fills gaps between the coolant loop and the plurality of individual battery cells.

In some embodiments, the tops and/or bottoms of the individual battery cells can be left exposed after the molded insert hardens. This may enable electrical connections to the individual battery cells by way of soldered wires, or any other form of electrical bus bar. In other embodiments, the electrical connections between the individual battery cells can be made prior to insertion into the injection mold. In these embodiments, the molded insert can cover the tops and/or bottoms of the individual battery cells. In some embodiments, a top and/or bottom of the molded insert can stop short of the tops and/or bottoms of the individual battery cells as depicted in FIG. 7 above. In these embodiments, the molded insert can stop 1 mm, 3 mm, 5 mm, 7 mm, 10 mm, 12 mm, 15 mm, and/or between 1 mm and 20 mm from the top and/or bottom of the individual battery cells.

It should be appreciated that the specific steps illustrated in FIG. 9 provide particular methods of providing a molded insert for a battery pack for an electric vehicle according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A battery pack for an electric vehicle, the battery pack comprising:
   a plurality of battery cells arranged in on or more rows;
   a coolant loop; and
   a molded insert that encompasses the plurality of cells and the coolant loop such that the plurality of cells and the coolant loop are fixed relative to each other, wherein the molded insert comprises a single injection-molded piece that that is injected around the plurality of battery cells to encase the coolant loop.

2. The battery pack of claim 1, wherein the molded insert is injection molded around the plurality of battery cells and the coolant loop using an injection mold.

3. The battery pack of claim 2, wherein the injection mold comprises holes for the coolant loop to exit the injection mold.

4. The battery pack of claim 2, wherein the molded insert requires less than 10 minutes to solidify after the molded insert is injection molded.

5. The battery pack of claim 1, wherein the molded insert is comprised of one or more plastics or epoxies.

6. The battery pack of claim 1, wherein the molded insert fills a gap between the coolant loop and the plurality of battery cells.

7. The battery pack of claim 1, wherein the molded insert leaves tops and bottoms of the plurality of battery cells exposed.

8. The battery pack of claim 1, wherein the molded insert fills gaps between the plurality of battery cells.

9. The battery pack of claim 1, wherein a top of the molded insert is level with a top of the plurality of battery cells.

10. The battery pack of claim 1, wherein a top of the molded insert stops at least 5 mm below a top of the plurality of battery cells.

11. A method of manufacturing a battery pack for an electric vehicle, the method comprising:
providing an injection mold;
placing a plurality of battery cells in the injection mold arranged in one or more rows;
routing a coolant loop around the one or more rows of the plurality of battery cells in the injection mold; and
injection molding a molded insert that encompasses the plurality of cells and the coolant loop such that the plurality of cells and the coolant loop are fixed relative to each other, wherein the molded insert comprises a single injection-molded piece that that is injected around the plurality of battery cells to encase the coolant loop.

12. The method of claim 11, wherein the coolant loop is routed out of the injection mold.

13. The method of claim 12, wherein the injection mold comprises holes for the coolant loop to exit the injection mold.

14. The method of claim 12, wherein the molded insert requires less than 10 minutes to solidify after the molded insert is injection molded.

15. The method of claim 11, wherein the molded insert is comprised of one or more plastics or epoxies.

16. The method of claim 11, wherein the molded insert fills a gap between the coolant loop and the plurality of battery cells.

17. The method of claim 11, wherein the molded insert leaves tops and bottoms of the plurality of battery cells exposed.

18. The method of claim 11, wherein the molded insert fills gaps between the plurality of battery cells.

19. The method of claim 11, wherein a top of the molded insert is level with a top of the plurality of battery cells.

20. The method of claim 11, wherein a top of the molded insert stops at least 3 mm below a top of the plurality of battery cells.

* * * * *